Jan. 18, 1955  M. A. STICELBER  2,699,737
DOUGH SHEETING APPARATUS
Filed Dec. 23, 1947
Fig. 1.
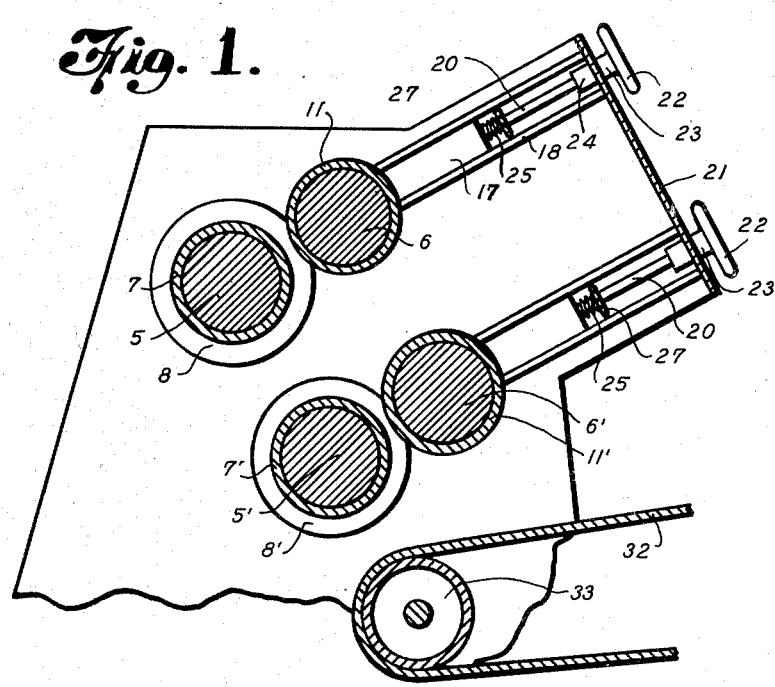
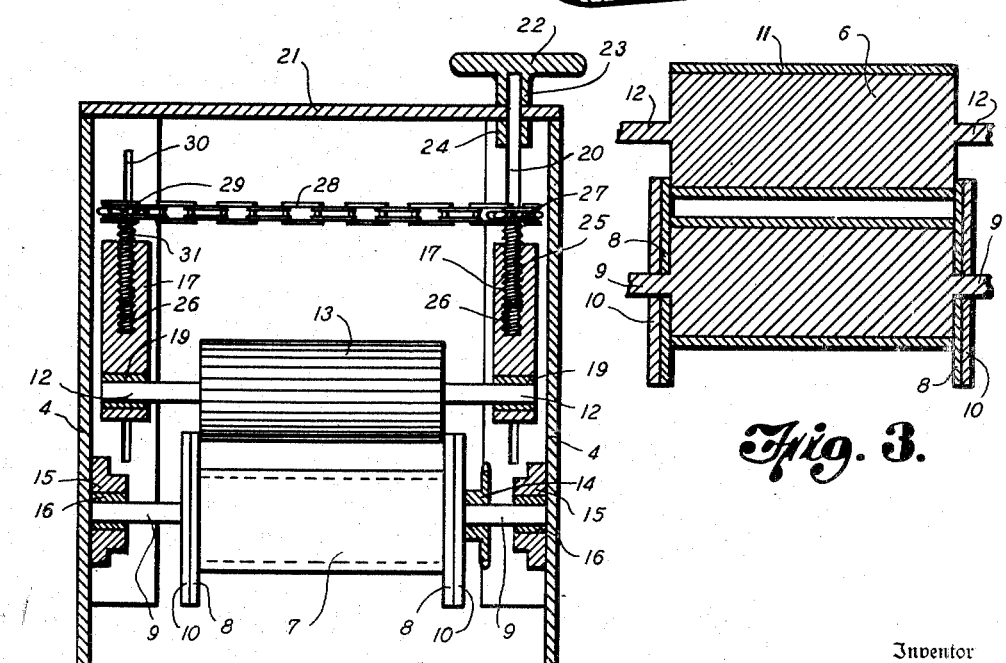
Fig. 3.
Fig. 2.
Inventor
MERLIN A. STICELBER
Alfred R. Fuchs
Attorney

United States Patent Office 2,699,737
Patented Jan. 18, 1955

2,699,737

DOUGH SHEETING APPARATUS

Merlin A. Stickelber, Kansas City, Mo., assignor to Stickelber & Sons, Inc., a corporation of Missouri Application December 23, 1947, Serial No. 793,359

7 Claims. (Cl. 107—12)

My invention relates to a sheeting apparatus, and more particularly to a sheeting apparatus that eliminates the use of dusting flour.

In dough sheeting machines, whether used as part of a bread molding machine or otherwise for sheeting dough, it is necessary that the dough is prevented from adhering to the rollers that form the sheeting means. In order to keep the rollers clean it is common practice to not only use a large quantity of dusting flour to prevent sticking, but to provide scrapers to prevent the sticking of the sheeted dough to the rollers and to prevent any dough from adhering to the rollers that might interfere with the operation thereof. In order to obtain the proper functioning of any machine that sheets dough it is necessary that the dough engaging surfaces of the sheeting rollers be kept clean so that the surfaces will remain smooth and the pieces of dough will not stick thereto.

It is a particular purpose of my invention to provide means for sheeting dough that does away entirely with the use of dusting flour and scrapers, the dough sheeting rollers being of such a character that dough will not adhere thereto even though the dough is sticky and no dusting flour is used.

In machines for sheeting dough it is customary to feed rounded pieces of dough to sheeting rollers or pieces of dough that have been previously sheeted to other rollers to obtain an additional sheeting action on the dough after it has already been rolled into a sheet-like form, for the purpose of better distributing moisture and provide a more uniform cell structure in the loaf formed from the sheeted dough. In either case the dough pieces that were rounded or that have been rounded and previously sheeted are fed to the sheeting mechanism at a regular rate at spaced intervals. Accordingly if any sticking on any of the rollers of any of the pieces of dough occurs in their progress through the machine, this will cause either mutilated loaves of bread that are not the proper shape due to such sticking action or the adherence of two or more pieces of dough to each other in going through the machine, due to the fact that the pieces of dough have been delayed in their progress through the machine because of sticking to the rollers. Such double or multiple pieces of sheeted dough will, of course, produce loaves of improper size and shape and must be removed from the machine and re-divided and re-sheeted.

In order to avoid these difficulties it has been customary to apply large quantities of dusting flour to the rollers of sheeting mechanism to reduce the sticking action. However, the use of such large quantities of dusting flour causes flour streaks in the dough and in the finished loaf of bread, which are undesirable. Even when large quantities of dusting flour are used, sticking occurs occasionally and interferes with the operation of the machine of which the sheeting mechanism is a part. This sometimes makes it necessary to stop the machine and clean off the sheeting rollers.

It is the principal purpose of my invention to provide a sheeting mechanism comprising rollers that are of such a character that dough, no matter how sticky, will not stick thereto, and which sheet the dough without the use of any dusting flour whatsoever, and without the use of any roll scrapers and to provide a method of sheeting dough by passing the same between rollers that have surfaces of such a character that the dough will not stick thereto, said dough being passed between said rollers without the utilization of any dusting flour or roll scrapers.

By eliminating the use of scrapers the friction between the scrapers and the rollers that ordinarily creates considerable heat is avoided. The heat created by the friction of the scrapers on the rollers increases the temperature of the dough, which is in a warm condition when it reaches the sheeting rollers and that increases the stickiness of the dough and thus the sticking action on rollers that are provided with scrapers. By eliminating the scrapers the heat of the dough is prevented from rising due to such frictional heat and thus the stickiness thereof is reduced.

I have found that dough, no matter how sticky, will not stick to rollers of certain plastic materials or rollers that have a surface made of certain plastic materials. These plastic materials are synthetic resins, and the particular class of synthetic resins that have been found to act in this manner are polymers of tetrafluoroethylene.

The specific material that I have found to be particularly adaptable for use as roller surfaces for sheeting rollers for dough is a polytetrafluoroethylene polymer. This material has no true melting point, but undergoes a solid-phase transition at 620° F., with a sharp decrease in strength, but at the temperatures at which it is used in sheeting dough the strength of the material is not impaired and it is not affected in any manner by, nor does it have any effect on, the dough that engages the same. The material does not absorb water, is substantially impermeable to moisture and does not undergo any detectable change even when exposed to weathering.

My improved sheeting apparatus specifically comprises rollers that are provided with a surface of a material, such as that above specifically referred to, that has the properties that dough will not adhere thereto, no matter how sticky it may be. Preferably, such a surface for sheeting rollers is obtained by providing an outer ply or layer of material that has these characteristics, on a metallic roller. In dough sheeting apparatus of the character to which my invention is applied there is ordinarily a flanged roller that cooperates with an unflanged roller and both rollers are provided with the surface material that has the non-sticking properties above referred to. Also the flanges on the flanged roller are provided with facings of the material that has these non-sticking properties on the side thereof that the dough would engage.

Other objects and advantages of my invention will appear as the description of the drawings proceeds. I desire to have it understood, however, that I do not intend to limit myself to the particular details shown or described, except as defined in the claims.

In the drawings:

Fig. 1 is a fragmentary vertical sectional view through a dough sheeting apparatus to which my invention has been applied.

Fig. 2 is a section taken on the line 2—2 of Fig. 1, and

Fig. 3 is a fragmentary sectional view through a pair of dough sheeting rollers made in accordance with my invention.

Referring in detail to the drawings, dough sheeting apparatus is shown that is provided with suitable framework having the side members 4 between which the rollers are mounted for rotation. The rollers are arranged in pairs, and in the particular apparatus illustrated, two pairs of such rollers are shown for sheeting the dough, although one or more pairs may be utilized, depending on what sort of a sheeting operation and for what purpose the sheeting operation is to be performed. In the sheeting apparatus illustrated in Figs. 1 and 2, the dough pieces, which may be rounded pieces of dough, are fed into the machine from the top thereof, coming into engagement with the upper pair of rollers first and then in engagement with the lower pair of rollers. The upper pair of rollers comprises a flanged roller having a central metallic body portion 5 and an unflanged roller having a central metallic body portion 6. The lower pair of rollers comprises a flanged roller having a central metallic body portion 5′ and an unflanged roller cooperating therewith having a central metallic body portion 6', the rollers of the upper and lower pair being of the same construction, the details of construction of only one pair will be described.

The flanged roller of each pair has mounted on the cylindrical metallic body portion 5 a tubular member 7 of a plastic material, such as a synthetic resin, to which dough will not adhere, the material preferred being a polytetrafluoroethylene polymer having the above referred to characteristics. The tubular sleeve 7 of the resin having the non-sticking properties and which is of such a character that it has no effect whatsoever on the quality of the dough engaging therewith, is made of such a size that it will closely fit the cylindrical surface of the central body portion 5 of the roller and is pressed onto the roller so as to be fixed thereto to rotate with the body portion 5. A pair of disk-like members 8 of the same material as the member 7 are pressed onto the reduced portions 9 of the roller, which serve as shaft portions that are mounted in suitable bearings, as will be described below. Metallic disks 10 are also pressed onto said reduced end portions 9 and the disks 8 engage face to face with the flat end faces of the body portion 5 and with the end edges of the tubular outer member 7 of the roller. Thus a flanged roller is provided that has all the surface portions thereof with which the dough might engage, made of a material to which the dough, no matter how sticky, will not adhere and which material is of such a character that it will not have any effect on the quality of the dough. That is, the material is of such an inert character that it will not affect the taste of the dough or of the bread or other product from which the dough is made due to engagement of the dough therewith.

Cooperating with the flanged roller is the plain roller that has the inner cylindrical body portion 6 of metal, said roller having a tubular outer wall portion 11, which is made in the same manner as the tubular wall portion 7, and is mounted on the roller 6 in the same manner, being of such a size that when pressed onto the cylindrical surface of the roller 6 it will be fixed thereto and rotate therewith. The roller 6 and the tubular outer shell or covering 11 of said roller are co-extensive in length, as will be obvious from Fig. 3.

As the component parts of the upper and lower pair of rollers are the same except for the relative position thereof, the same reference numerals are applied to the parts of the lower rollers as to the parts of the upper rollers, except that these are primed for the lower rollers. The unflanged rollers have shaft portions 12 of reduced diameter extending from the central metallic body portions 6 thereof and serve as shaft portions that are mounted in suitable bearings in a manner to be described below.

The outer shell or surface forming members 11 of the unflanged rollers may be provided with suitable roughening or serrations thereon, these being indicated by the numeral 13 in Fig. 2. Said roughening or serrations would be of such minute character that the same would not show in a cross sectional view of the same as viewed in Figs. 1 and 3, except on a much larger scale than that in the drawings. While the serrations or roughening may not be necessary, a certain amount of frictional engagement with the rollers is required in order to feed the dough through the machine, and due to the fact that the rollers have such great properties of non-adherence, the roughening or serrating of the surface of one roller of each pair might be necessary under certain circumstances to assure the movement of the dough between the paired rollers without slippage. This roughening of the surface of the rollers provided with the non-adhering synthetic resin covering will not be necessary for all types of doughs, but may be required for certain types of doughs.

The rollers may be mounted in any desired manner in the framework, but are, preferably, mounted so as to be relatively adjustable so that the spacing of the same may be adjusted to obtain the desired thickness of the dough as the result of the sheeting action. Any suitable means may be provided for rotating the rollers. Ordinarily the flanged rollers only are positively driven and the unflanged rollers are driven by the action of the flanged rollers in moving the dough pieces through the machine. Any suitable driving means may be provided, a sprocket 14 being shown as being fixed on the one shaft portion 9 of one of the flanged rollers over which a sprocket chain driven in any suitable manner operates to rotate the shaft 9 and thus the flanged roller. The shaft 9 is mounted in fixed bearing members 15 provided on the frame members 4, which are provided with anti-friction bearing members 16.

While any suitable means for mounting the unflanged rollers for adjustment toward and away from the flanged rollers may be provided, the means illustrated comprises a pair of bearing brackets 17 that are mounted in suitable guideways 18 on the frame and which have anti-friction bearing means 19 provided therein for the shaft portions 12. Means is provided for adjusting the adjustable bearing brackets 17 comprising a rotatable shaft 20, which is mounted for rotation in a cross member 21 on the frame and which has a hand wheel 22 thereon for rotating the same in either direction, there being a hub 23 on the hand wheel engaging a cross member, and there being a collar 24 fixed on the shaft 20 to prevent endwise movement of the shaft relative to the frame.

The shaft 20 has a screw-threaded portion 25 that engages in an internally screw-threaded bore 26 in the one bearing member 17, and a sprocket 27 is fixed on the shaft 20 over which a sprocket chain 28 operates, which also operates over a sprocket 29 that is fixed on a shaft 30, which shaft has a screw-threaded portion 31 that engages the internally threaded bore 26 in the other bearing bracket 17.

It will accordingly be seen that if the hand wheel 22 is rotated in one direction the screw-threaded members 25 engaging the internal screw-threads 26 of the bracket 17 will move the roller having the shaft portions 12 away from the cooperating roller, and when rotated in the opposite direction will move said roller having the shaft portions 12 toward the cooperating roller. Each of the unflanged rollers is provided with an adjusting means, such as above described, and thus the rollers of each pair of rollers are adjustable relative to each other independently of the adjustment of the other pair of rollers. The dough piece or pieces that are to be sheeted are fed into the machine above the upper pair of rollers in any suitable manner and are discharged from the lower pair of rollers onto any suitable conveying means, such as a belt 32, which operates over a roller 33, which is driven in any suitable manner to carry the sheeted pieces of dough away from the sheeting mechanism to any suitable means by which suitable operations may be performed on the sheeted pieces of dough.

The outer tubular shell portions 7 and 11 and the flanges 8 on the paired rollers are made of a non-metallic material having the property of inadhesiveness of dough thereto, such as the polytetrafluoroethylene polymer above described. The said dough contacting portions 7, 11 and 8 are of such a character that sticky dough, such as is usually supplied to a sheeting mechanism, will not adhere thereto under any circumstances and the surfaces of the rollers and the dough do not have to be treated in any manner to prevent adherence of the dough thereto. While it has been found that by cooling rollers of metal to such an extent that ice does not form on the surface thereof, but so that moisture condenses thereon, dusting flour can be dispensed with, this requires refrigeration of the rollers and in addition the moisture that is thus added to the dough increases the moisture content of the dough slightly.

In my improved dough sheeting apparatus, no additional moisture nor additional flour is supplied to the dough while it is sheeted, which has the advantage that the dough remains with exactly the same moisture content after having passed through the sheeting apparatus as before having entered the same, whereas in the case of the use of dusting flour, which is unnecessary with my sheeting apparatus, the moisture content is reduced, while in the case of cooling of the rollers to the point that moisture condenses thereon the moisture content of the dough is increased. Furthermore the cooling of the rollers requires additional apparatus, which is not necessary when my improved dough sheeting rollers are used. In addition to that, a great amount of flour is saved and the flour streaks that would appear in the finished loaf are entirely avoided. Furthermore by providing rollers to which dough will not adhere or stick under any circumstances, all of the difficulties are avoided that are encountered in dough sheeting apparatus and bread molding machines due to the fact that even when large quantities of dusting flour are used dough pieces will stick to the rollers ordinarily provided. Thus any mutilation of the loaves due to double or multiple pieces of sheeted dough being delivered from the sheeting apparatus is avoided. In addition to this, scrapers are entirely dispensed with. Ordinarily in sheeting apparatus some scraping means is provided in cooperation with the rollers to remove any dough that might be adhering thereto and aid in peeling the sheeted piece of dough from the roller in case it sticks thereto. Such a peeling action is absolutely unnecessary when the rollers are provided with a covering layer or sheath constituting a dough engaging surface that is made of a plastic material of the character herein described to which nothing will stick.

What I claim is:

1. Dough sheeting apparatus comprising a pair of rollers mounted in predetermined spaced relation, said rollers having an inner metallic load sustaining core and an outer sleeve of a polymer of tetrafluoroethylene, and means for rotating said rollers in opposite directions, said core being thicker than said sleeve.

2. Dough sheeting apparatus comprising a pair of rollers mounted in predetermined spaced relation, one of said rollers being flanged, said rollers having an inner metallic core and a rigid tubular outer sleeve of a polymer of tetrafluoroethylene fixed to said core, and the flanges on said flanged roller having facings on the inner sides thereof of a polymer of tetrafluoroethylene, and means for rotating said rollers in opposite directions.

3. In dough sheeting apparatus of the character described, a roller having an inner metallic core and a rigid tubular outer sleeve of a polymer of tetrafluoroethylene mounted on said core, and disk-like members engaging the ends of said core and sleeve.

4. Dough sheeting apparatus comprising a pair of rollers mounted in predetermined spaced relation, said rollers each having an inner load sustaining metallic core and a sleeve of a polymer of tetrafluoroethylene fixed on said core, and means for rotating said rollers in opposite directions.

5. A dough sheeting roller having an inner rigid load sustaining core and an outer cylindrical surface covering of a polymer of tetrafluoroethylene extending continuously completely around in engagement with said core and mounted thereon to rotate therewith.

6. A dough sheeting roller having an inner load sustaining metallic core, a rigid tubular sheath of a polymer of tetrafluoroethylene extending continuously completely around in engagement with said core and mounted thereon to rotate therewith, and end flanges on said roller at opposite ends of said sheath extending outwardly beyond the same.

7. A dough sheeting roller having flanges at each end thereof, an inner load sustaining metallic core and a tubular sheath of tetrafluoroethylene resin mounted on said core to rotate therewith and having an outer smooth cylindrical surface extending continuously completely around said core between said flanges with said flanges in engagement with the opposite extremities thereof, said sheath being confined between said flanges, said outer cylindrical surface of said sheath constituting the entire exposed dough engaging surface of said roll between said flanges.

References Cited in the file of this patent

UNITED STATES PATENTS

| Number | Name | Date |
|---|---|---|
| 29,006 | Rice et al. | July 3, 1860 |
| 160,945 | Ocherhausen | Mar. 16, 1875 |
| 534,071 | Mitchell | Feb. 12, 1895 |
| 784,111 | Lautner, Jr. | Mar. 7, 1905 |
| 815,811 | Goodman | Mar. 20, 1906 |
| 968,109 | Barbieri | Aug. 23, 1910 |
| 1,147,491 | Embrey | July 20, 1915 |
| 1,339,637 | Tybout | May 11, 1920 |
| 1,398,621 | Braddick | Nov. 29, 1921 |
| 1,479,898 | Collins et al. | Jan. 8, 1924 |
| 2,070,199 | Dixon | Feb. 9, 1937 |
| 2,078,839 | Conan et al. | Apr. 27, 1937 |
| 2,125,859 | Liebelt | Aug. 2, 1938 |
| 2,165,718 | Mun | July 11, 1939 |
| 2,230,654 | Plunkett | Feb. 4, 1941 |
| 2,357,085 | Cohen et al. | Aug. 29, 1944 |
| 2,392,695 | Rohdin | Jan. 8, 1946 |
| 2,403,476 | Berry et al. | July 9, 1946 |
| 2,424,558 | Delano | July 29, 1947 |

OTHER REFERENCES

Chem. & Metallurgical Eng., Apr. 1946, page 145.
Modern Plastics, June 1946, pages 134 and 135.
Plastics, July 1946, pages 32, 34, and 97.
The Chemical Age, July 13, 1946, page 44.
Indust. & Eng. Chem., vol. 38, No. 9, Sept. 1946, pages 871–877.
Modern Plastics, Nov. 1947, pages 108–109.